United States Patent
Künstler et al.

(10) Patent No.: US 12,492,958 B2
(45) Date of Patent: Dec. 9, 2025

(54) METHOD AND SYSTEM FOR UNLOCKING A CALIBRATABLE ELECTRONIC TORQUE TOOL, TORQUE TESTING DEVICE, AND TORQUE TOOL

(71) Applicant: Hoffmann Engineering Services GmbH, Munich (DE)

(72) Inventors: Marko Künstler, Munich (DE); Freddy Lippach, Munich (DE); Matthias Hildebrandt, Germering (DE)

(73) Assignee: Hoffmann Engineering Services GmbH, Munich (DE)

( * ) Notice: Subject to any disclaimer, the term of this patent is extended or adjusted under 35 U.S.C. 154(b) by 305 days.

(21) Appl. No.: 18/207,441

(22) Filed: Jun. 8, 2023

(65) Prior Publication Data

US 2023/0400374 A1 Dec. 14, 2023

(30) Foreign Application Priority Data

Jun. 10, 2022 (DE) ...................... 10 2022 114 714.2

(51) Int. Cl.
*G01L 25/00* (2006.01)
*B25B 23/142* (2006.01)

(52) U.S. Cl.
CPC ........ *G01L 25/003* (2013.01); *B25B 23/1425* (2013.01); *B25B 23/1427* (2013.01)

(58) Field of Classification Search
CPC ............. G01L 25/003; B25B 23/1425; B25B 23/1427; B25B 21/00; G01D 18/00; G01D 3/08
See application file for complete search history.

(56) References Cited

U.S. PATENT DOCUMENTS

2003/0094081 A1* 5/2003 Becker ................ B25B 23/1425
81/479
2007/0095154 A1 5/2007 Schuele et al.
(Continued)

FOREIGN PATENT DOCUMENTS

CN 209304453 U * 8/2019
DE 199 12 837 10/2000
(Continued)

OTHER PUBLICATIONS

Europe Search Report/Office Action #1 conducted in counterpart Europe Appln. No. 23176003 (Nov. 15, 2023).
(Continued)

*Primary Examiner* — Francis C Gray
(74) *Attorney, Agent, or Firm* — GREENBLUM & BERNSTEIN, P.L.C.

(57) ABSTRACT

A method and system for unlocking a calibratable electronic torque tool and a torque testing device and the calibratable electronic torque tool. To unlock the calibratable electronic torque tool, a tool head of the calibratable electronic torque tool is coupled to the torque testing device and a direct data link is established. The calibratable electronic torque tool and the torque testing device separately determine torque test values, which are transferred to a data processing device of the torque testing device and compared with each. If the difference between the torque test values is within a specified or specifiable tolerance range, an unlocking signal is transferred to the calibratable electronic torque tool via the data link and the calibratable electronic torque tool is unlocked by overriding a lock via the transferred unlocking signal.

20 Claims, 1 Drawing Sheet

(56) References Cited

U.S. PATENT DOCUMENTS

| | | |
|---|---|---|
| 2009/0222222 A1 | 9/2009 | Lucke |
| 2018/0058969 A1* | 3/2018 | Mokhbery ............. G01L 3/108 |
| 2018/0361547 A1 | 12/2018 | Gauthier et al. |
| 2020/0400525 A1 | 12/2020 | King et al. |
| 2022/0048168 A1* | 2/2022 | Vizachero ............. B25B 13/461 |
| 2022/0241943 A1 | 8/2022 | Nakamoto et al. |

FOREIGN PATENT DOCUMENTS

| | | | |
|---|---|---|---|
| DE | 20 2014 106 020 | 1/2015 | |
| EP | 2096425 | 4/2017 | |
| EP | 3795954 | 5/2022 | |
| EP | 3995359 | 5/2022 | |
| TW | 201505782 A * | 2/2015 | ......... B25B 23/1422 |
| WO | 2005/108013 | 11/2005 | |

OTHER PUBLICATIONS

Europe Search Report/Office Action #2 conducted in counterpart Europe Appln. No. 23176003 (Mar. 3, 2024).

Europe Search Report/Office Action #3 conducted in counterpart Europe Appln. No. 23162329 (Nov. 15, 2023).

Bedienungsanleitung Digitales Drehmoment-Prüfgerät [Instructional manual Digital Torque Tester]; Sauter GmbH, Version 1.1 (Dec. 2017) (with translation).

Drehmomentmesstechnik [Torque measurement], ZEMO Vertriebs GmbH, (May 2016) (with translation).

* cited by examiner

METHOD AND SYSTEM FOR UNLOCKING A CALIBRATABLE ELECTRONIC TORQUE TOOL, TORQUE TESTING DEVICE, AND TORQUE TOOL

CROSS-REFERENCE TO RELATED APPLICATION

This application claims priority under 35 U.S.C. § 119(a) to German Application No. 10 2022 114 714.2 filed Jun. 10, 2022, the disclosure of which is expressly incorporated by reference herein in its entirety.

BACKGROUND

1. Field of the Invention

Embodiments are directed to a method for unlocking a calibratable electronic torque tool, to a system for unlocking a calibratable electronic torque tool, a torque testing device, and a torque tool.

2. Discussion of Background Information

Calibratable electronic torque tools, such as torque wrenches and torque screwdrivers, are frequently used to tighten screws, nuts, and similar connecting elements with a defined torque. When the defined torque is reached, this is displayed and/or a signal is output, for example a visual or audible signal.

To ensure that the actual applied torque corresponds to the displayed or output torque of the torque tool, the torque tool must be calibrated. For the calibration, the torque tools are frequently brought to a calibration laboratory that is approved for this purpose and readjusted or, respectively, calibrated there by a calibration device. Then, the torque tool is provided, for example, with a test seal to display that it is considered calibrated for a specific period of time.

However, it can occur that a tool is no longer correctly calibrated despite a valid test seal. This is the case, for example, if the tool was subjected to a strong shock after the calibration, was strained too much, or was used too often. When such a tool that is no longer correctly calibrated is used, there is a risk that connecting elements are tightened with the wrong torque. This can lead to workpieces coming loose or being damaged.

To prevent such damage, torque tools are known that are locked for further use after events occur that could impair the calibration. In many cases, the lock is only overridden once the tool has been recalibrated in a calibration laboratory. This calibration process, however, is time-intensive, regardless of whether the calibration of the torque tool was actually impaired by the event.

SUMMARY

Embodiments are directed to simplifying the use of calibratable electronic torque tools and at the same time ensuring that no improperly calibrated torque tools are used.

According to embodiments, a method for unlocking a calibratable electronic torque tool, in particular a torque wrench or a torque screwdriver, the use of which is prevented by a lock, includes the following:
coupling a tool head of the torque tool to a tool head holder of a torque testing device,
establishing a direct data link between the torque tool and the torque testing device,
determining a testing device-side torque test value of the torque tool by a torque sensor of the torque testing device,
determining a tool-side torque test value of the torque tool by a torque sensor of the torque tool,
transferring the tool-side torque test value to the torque testing device by the data link,
comparing the tool-side torque test value with the testing device-side torque test value by a data processing device, which is integrated into the torque testing device,
generating an unlocking signal if a difference between the tool-side torque test value and the testing device-side torque test value is within a specified or specifiable tolerance range,
transferring the unlocking signal to the torque tool via the data link, and
unlocking the torque tool by overriding the lock by the unlocking signal.

The lock prevents the use of the torque tool and is activated, for example, to prevent use of the torque tool after an event that could impair the calibration of the torque tool. Until now, after such an event it has been necessary to completely recalibrate the torque tool in a calibration laboratory. Advantageously, the method according to the invention now provides a significantly faster and simpler possibility to unlock the torque tool. For this purpose, it is ascertained with the torque testing device whether a difference between the torque test value measured by the torque testing device and the torque test value measured by the torque tool itself is within the tolerance range. If this is the case, the lock is overridden. If this is not the case, the torque tool must be recalibrated.

In particular, the lock can be activated and/or deactivated electronically. In particular, the lock is an electronic lock. The usability of the torque tool is locked by the lock in particular mechanically and/or electronically and/or magnetically. For example, the lock disables the torque tool so that tightening a connecting element is impossible when the lock is activated. In particular, it is additionally or alternatively displayed that the torque tool is disabled. According to another example, the lock causes the torque tool to slip regardless of the applied torque.

A calibratable electronic torque tool is in particular a tool that has a tool head, by which a torque can be exerted on a connecting element directly or indirectly, wherein the torque exerted by the tool head is measured and in particular displayed and/or output. In particular, the torque tool outputs a signal and/or prevents further tightening when a defined torque has been reached. For example, when the set torque is reached, an audible, tactile and/or visible signal is displayed, e.g., a click or clack.

The tool head is in particular a part of the torque tool that is configured to engage with a drive of a workpiece or to be coupled to an attachment that engages with a drive of a workpiece. For example, the tool head engages with a screw head drive or grips a nut. According to another example, an attachment is placed on the tool head, which engages with the screw head drive or grips around the nut.

The data link is made directly between the torque tool and the torque testing device, without detours via an additional device, e.g., a server. In particular, the direct data link is established by a transmitting and receiving device of the torque tool and a transmitting and receiving device of the torque testing device.

The torque testing device is in particular designed as one piece. In particular, it is a single, compact device that can be coupled to the torque tool. This simplifies performing the method. In particular, the torque testing device can be coupled to the tool directly by the tool head holder or by an adapter in order to determine the testing device-side torque test value. In particular, the torque testing device comprises a housing, wherein the transmitting and receiving device and the data processing device are integrated into the housing. The tool head holder is provided in particular on the housing.

The tolerance range is in particular +/−2% to +/−3% or up to +/−1% of the testing device-side torque test value. The testing device-side torque test value indicates in particular the torque actually applied at the tool head, while the tool-side torque test value indicates the torque that is measured by the tool. The tolerance range may depend on the application for with the electronic torque tool is to be used. If the electronic torque tool is used for application where a high degree of accuracy is required, the tolerance range may be specified to be +/−1% or less of the testing device-side torque test value. Otherwise, the tolerance range may be specified to be +/−1% to +/−3% or higher, for example +/−1% to +/−5%.

If the difference between the testing device-side torque test value and the tool-side torque test value is outside the tolerance range, no unlocking signal is generated and the torque tool remains locked. The torque tool can only be used again once it has been recalibrated. According to one embodiment, the torque testing device is not configured to calibrate or recalibrate the torque tool. According to another embodiment, the torque testing device is configured to automatically adjust the torque tool.

The direct data link is preferably a wireless data link, in particular a radio link.

A wireless data link is advantageous because it can be established particularly quickly and simply. For example, the direct data link is a data link using the Bluetooth standard.

The tool-side torque test value and the testing device-side torque test value are preferably displayed, preferably simultaneously, on a display device of the torque testing device.

For example, the torque test values are displayed next to each other or one below the other. This simplifies the testing of the calibration by a worker who wants to unlock the torque tool.

Preferably, the lock of the torque tool is overridden by the unlocking signal only for a temporary period of time or a specifiable or specified number of use cycles, wherein the duration of the temporary period of time is in particular specified or can be specified. The number of use cycles may be specified depending on a known number of uses of the electronic torque tool required to fulfill a certain task and/or a number of uses the electronic torque tool is used on average per day.

For example, the lock is overridden for the shift of a worker, a workday or a work week or the lock is overridden, for example, for 100 or 1,000 use cycles. Before the use of the torque tool, it is ensured in this way that it is correctly calibrated. This prevents an improperly calibrated tool being used.

The lock of the torque tool is activated in particular if a shock sensor of the torque tool registers a shock that exceeds a specifiable or specified shock limit.

In the event that the torque tool falls down or is subjected to a shock in another manner, it may no longer be correctly calibrated under certain circumstances. In this case, the lock is activated to prevent working with an incorrectly calibrated tool. By testing the calibration by the torque testing device, the lock can be overridden if it is ascertained that the calibration is still within the tolerance range despite the shock. In this case, recalibration at a calibration laboratory is no longer necessary. The shock limit may be specified by testing at which level of shock the electronic torque tool losses its calibration on average. The shock limit may be set to be at this level of slightly below this level.

In particular, the torque tool comprises an environmental parameter sensor, in particular a temperature sensor and/or a moisture sensor. The lock of the torque tool is activated in particular if the environmental parameter sensor registers a measurement value that exceeds a specifiable or specified limit for the environmental parameter sensor. For example, the limit for the environmental parameter sensor is a maximum temperature or a level of moisture. The maximum temperature and/or the level of moisture may be specified by testing at which temperature and/or level of moisture the electronic torque tool losses its calibration on average. The maximum temperature and/or level of moisture may be set to be at this temperature and/or level of moisture or slightly below this level.

Preferably, the lock of the torque tool is activated if the torque sensor of the torque tool registers a torque value that exceeds a specifiable or specified torque limit. The torque limit may be specified by testing at which torque level the electronic torque tool losses its calibration on average. The torque limit may be set to be at torque level or slightly below this level.

Even after an overstress of the tool, for example, by overtightening, the torque tool may no longer be correctly calibrated under certain circumstances. In this case, the lock is also preferably activated and can be overridden again after it passes a test by the torque testing device.

In particular, the measured torque test values and the relevant measurement parameters are stored in the torque testing device. In particular, data, in particular the torque test values and/or an evaluation of the torque test values, are transferred to another device or a central quality management system. This occurs, for example, for digital documentation. The evaluation is, for example, a good/bad assessment, meaning an OK/NOK evaluation.

According to further embodiments, a method for checking a calibration of a calibratable electronic torque tool, in particular a torque wrench or a torque screwdriver, includes:
 coupling a tool head of the torque tool to a tool head holder of a torque testing device,
 establishing a direct data link between the torque tool and the torque testing device,
 determining a testing device-side torque test value of the torque tool by a torque sensor of the torque testing device.
 determining a tool-side torque test value of the torque tool by a torque sensor of the torque tool,
 transferring the tool-side torque test value to the torque testing device by the data link,
 simultaneously displaying the tool-side torque test value and the testing device-side torque test value on a display device of the torque testing device.

Embodiments are directed to a system for unlocking a calibratable electronic torque tool, in particular a torque wrench or a torque screwdriver, the use of which is prevented by a lock. The system includes the torque tool and a torque testing device, where the torque tool includes a tool body, a tool head, a transmitting and receiving device, and a torque sensor, and where the torque testing device includes a tool head holder, a transmitting and receiving device, a torque sensor, and an integrated data processing device. The tool head holder is designed to hold the tool head, and the transmitting and receiving device of the torque tool and the transmitting and receiving device of the torque testing device are configured to establish a direct data link between the torque tool and the torque testing device. The torque testing device is configured to determine a testing device-side torque test value of the torque tool by the torque sensor of the torque testing device, and the torque tool is configured to determine a tool-side torque test value of the torque tool by the torque sensor of the torque tool and to transfer the tool-side torque test value to the torque testing device via the data link. The data processing device is configured to receive the tool-side torque test value and the testing device-side torque test value, compare them to each other, and generate an unlocking signal, if a difference between the tool-side torque test value and the testing device-side torque test value is within a specified or specifiable tolerance range. The data processing device is furthermore configured to transfer the unlocking signal to the torque tool via the data link, wherein the torque tool is configured to be unlocked by overriding the lock by the unlocking signal.

The system embodies the same advantages, features, and characteristics as the previously described method for unlocking a calibratable electronic torque tool. The system is designed in particular to carry out the method according to one of the previously shown embodiments.

The torque testing device includes in particular a display device, which is configured to display, in particular simultaneously, the tool-side torque test value and the testing device-side torque test value.

The torque tool preferably includes a shock sensor, wherein the torque tool is configured to activate the lock of the torque tool if the shock sensor registers a shock that exceeds a specifiable or specified shock limit.

The torque tool is preferably configured to activate the lock of the torque tool if the torque sensor of the torque tool registers a torque value that exceeds a specifiable or specified torque limit.

Embodiments are directed to a system for checking a calibration of a calibratable electronic torque tool, in particular a torque wrench or a torque screwdriver. The system includes the torque tool and a torque testing device, where the torque tool includes a tool body, a tool head, a transmitting and receiving device, and a torque sensor, and where the torque testing device includes a tool head holder, a transmitting and receiving device, a torque sensor, and a display device. The tool head holder is designed to hold the tool head, and the transmitting and receiving device of the torque tool and the transmitting and receiving device of the torque testing device are configured to establish a direct data link between the torque tool and the torque testing device. The torque testing device is configured to determine a testing device-side torque test value of the torque tool by the torque sensor of the torque testing device, and the torque tool is configured to determine a tool-side torque test value of the torque tool by the torque sensor of the torque tool and to transfer the tool-side torque test value to the torque testing device via the data link. The display device is configured to simultaneously display the tool-side torque test value and the testing device-side torque test value.

Embodiments are directed to a torque testing device that includes a tool head holder, a transmitting and receiving device, a torque sensor, and an integrated data processing device. The torque testing device is configured and/or designed to carry out the following method steps of the method according to one of the previously described embodiments:

establishing a direct data link between the torque testing device and a torque tool by the transmitting and receiving device of the torque testing device, determining a testing device-side torque test value of the torque tool by the torque sensor of the torque testing device after a tool head of the torque tool has been coupled to the tool head holder of the torque testing device, and receiving a tool-side torque test value by the data link.

The torque testing device is furthermore configured to display, in particular simultaneously, the tool-side torque test value and the testing device-side torque test value on a display device of the torque testing device and/or to execute the following method steps comparing the tool-side torque test value with the testing device-side torque test value by the data processing device, generating an unlocking signal if a difference between the tool-side torque test value and the testing device-side torque test value is within a specified or specifiable tolerance range, and transferring the unlocking signal to the torque tool via the data link.

In other words, the torque testing device is designed to establish a data link to a torque tool, to determine the testing device-side torque test value after coupling with the tool head, and to receive the tool-side torque test value from the torque tool.

According to one embodiment, the torque testing device includes a display device, which is configured and designed to display, in particular simultaneously, the tool-side torque test value and the testing device-side torque test value. The torque test values can be compared at a glance by the display device configured in this way.

Additionally or alternatively to displaying the torque test values on the display device, the torque test values are compared with each other and, if the difference is within the tolerance range, the unlocking signal is generated and transferred to the torque tool. In this way, the calibration of the torque tool can be tested quickly and simply and the lock of the torque tool can be overridden.

In particular, the torque testing device can be configured to interact with a calibratable electronic torque tool in order to carry out the method according to one of the previously described embodiments.

Embodiments are directed to a calibratable electronic torque tool that includes a tool body, a tool head, a transmitting and receiving device, and a torque sensor. The torque tool is configured and/or designed to carry out the following method steps of the method according to one of the previously described embodiments:

establishing a direct data link between the torque tool and a torque testing device by the transmitting and receiving device of the torque tool, determining a tool-side torque test value of the torque tool by the torque sensor of the torque tool, transferring the tool-side torque test value to the torque testing device by the data link, receiving an unlocking signal from the torque testing device via the data link, and unlocking the torque tool by overriding a lock by the unlocking signal.

The torque testing device and the calibratable electronic torque tool embody the same advantages, features, and characteristics as the previously described method for unlocking a calibratable electronic torque tool and the previously described system for unlocking a calibratable electronic torque tool.

The calibratable electronic torque tool is designed in particular to interact with a torque testing device to carry out the method according to a previously described embodiment. The tool head of the calibratable electronic torque tool is designed in particular to be coupled to a tool holder of the torque testing device.

Embodiments are directed to a method for unlocking a calibratable electronic torque tool that has been locked to prevented operation. The method includes coupling a tool head of the calibratable electronic torque tool to a tool head holder of a torque testing device; establishing a direct data link between the calibratable electronic torque tool and the torque testing device; determining a testing device-side torque test value of the calibratable electronic torque tool by a torque sensor of the torque testing device;

determining a tool-side torque test value of the torque tool by a torque sensor of the torque tool;
transferring the tool-side torque test value to the torque testing device via the direct data link;
comparing, via a data processing device integrated in the torque testing device, the tool-side torque test value with the testing device-side torque test value; generating an unlocking signal if a difference between the tool-side torque test value and the testing device-side torque test value is within a specifiable tolerance range; transferring the unlocking signal to the calibratable electronic torque tool via the direct data link; and unlocking the calibratable electronic torque tool by overriding the lock via the unlocking signal transferred to the calibratable electronic torque tool.

According to embodiments, the direct data link may be a wireless data link. Moreover, the direct data link may be a radio connection.

In accordance with embodiments, the tool-side torque test value and the testing device-side torque test value can be displayed on a display device of the torque testing device. In particular, the tool-side torque test value and the testing device-side torque test value may be displayed simultaneously on a display device of the torque testing device.

In embodiments, the lock of the calibratable electronic torque tool can be overridden by the unlocking signal only for a temporary period of time or a pre-specifiable number of use cycles, wherein the duration of the temporary period of time is predefinable.

According to other embodiments, the lock of the calibratable electronic torque tool may be activatable when a shock sensor of the torque tool registers a shock that exceeds a pre-specifiable shock limit.

In other embodiments, the lock of the calibratable electronic torque tool can be activatable when the torque sensor of the calibratable electronic torque tool registers a torque value that exceeds a pre-specifiable torque limit.

In accordance with embodiments, the calibratable electronic torque tool can be a torque wrench or a torque screwdriver.

Embodiments are directed to a system for unlocking a calibratable electronic torque tool that is prevented from operation by a lock. The system includes the calibratable electronic calibratable electronic torque tool comprising a tool body, a tool head, a transmitting and receiving device, and a torque sensor; and a torque testing device comprising a tool head holder, a transmitting and receiving device, a torque sensor, and an integrated data processing device. Further, the tool head holder is designed to hold the tool head and the transmitting and receiving device of the calibratable electronic torque tool and the transmitting and receiving device of the torque testing device are configured to establish a direct data link between the calibratable electronic torque tool and the torque testing device. The torque testing device is configured to determine a testing device-side torque test value of the calibratable electronic torque tool by the torque sensor of the torque testing device and the calibratable electronic torque tool is configured to determine a tool-side torque test value of the calibratable electronic torque tool by the torque sensor of the calibratable electronic torque tool and to transfer the tool-side torque test value to the torque testing device via the direct data link. The data processing device is configured to receive the tool-side torque test value and the testing device-side torque test value, compare them to each other, and generate an unlocking signal when a difference between the tool-side torque test value and the testing device-side torque test value is within a specifiable tolerance range. Still further, the data processing device is configured to transfer the unlocking signal to the calibratable electronic torque tool via the direct data link and the lock of the calibratable electronic torque tool is overridden and unlocked via the unlocking signal transferred to the calibratable electronic torque tool.

In accordance with embodiments, the torque testing device can further include a display device, which is configured to display the tool-side torque test value and the testing device-side torque test value. Further, the display device can be configured to simultaneously display the tool-side torque test value and the testing device-side torque test value.

According to embodiments, the calibratable electronic torque tool may further include a shock sensor, and the calibratable electronic torque tool can be configured to activate the lock of the calibratable electronic torque tool when the shock sensor registers a shock that exceeds a specifiable shock limit.

In other embodiments, the calibratable electronic torque tool can be configured to activate the lock of the calibratable electronic torque tool when the torque sensor of the calibratable electronic torque tool registers a torque value that exceeds a specifiable torque limit.

In still other embodiments, the calibratable electronic torque tool may be a torque wrench or a torque screwdriver.

Embodiments are directed to a torque testing device, which includes a tool head holder, a transmitting and receiving device, a torque sensor, and an integrated data processing device, and which is configured to perform a method that includes establishing a direct data link between the torque testing device and a calibratable electronic torque tool via the transmitting and receiving device of the torque testing device; determining, via the torque sensor of the torque testing device, a testing device-side torque test value of the calibratable electronic torque tool, which has a tool head; receiving a tool-side torque test value via the data link. The method can also include at least one of: displaying on a display device of the torque testing device the tool-side torque test value and the testing device-side torque test value; or comparing the tool-side torque test value with the testing device-side torque test value via the data processing device; generating an unlocking signal when a difference between the tool-side torque test value and the testing device-side torque test value is within a specified tolerance range; and transferring the unlocking signal to the calibratable electronic torque tool via the direct data link.

In accordance with still yet other embodiments, the tool-side torque test value and the testing device-side torque test value can be simultaneously displayed on the display.

Embodiments are directed to a calibratable electronic torque tool, which includes a tool body, a tool head, a transmitting and receiving device, and a torque sensor, and which is configured to perform a method that includes establishing a direct data link between the calibratable electronic torque tool and a torque testing device via the transmitting and receiving device of the calibratable electronic torque tool, determining a tool-side torque test value of the calibratable electronic torque tool via the torque sensor of the calibratable electronic torque tool, transferring the tool-side torque test value to the torque testing device via the direct data link, receiving an unlocking signal from the torque testing device via the direct data link, and via the received unlocking signal, overriding a lock of the calibratable electronic torque tool and unlocking the lock.

Further features of the invention will become evident from the description of embodiments according to the invention, together with the claims and the appended drawings. Embodiments according to the invention can fulfill individual features or a combination of several features.

Within the context of the invention, features which are labeled with "in particular" or "preferably" are to be understood to be optional features.

Other exemplary embodiments and advantages of the present invention may be ascertained by reviewing the present disclosure and the accompanying drawing.

BRIEF DESCRIPTION OF THE DRAWINGS

The invention is described below, without restricting the general idea of the invention, based on exemplary embodiments in reference to the drawings, whereby we expressly refer to the drawings with regard to the disclosure of all details according to the invention that are not explained in greater detail in the text. In the drawings, the same or similar elements and/or parts are, in each case, provided with the same reference numerals such that they are not introduced again in each case. Moreover, in the drawings.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
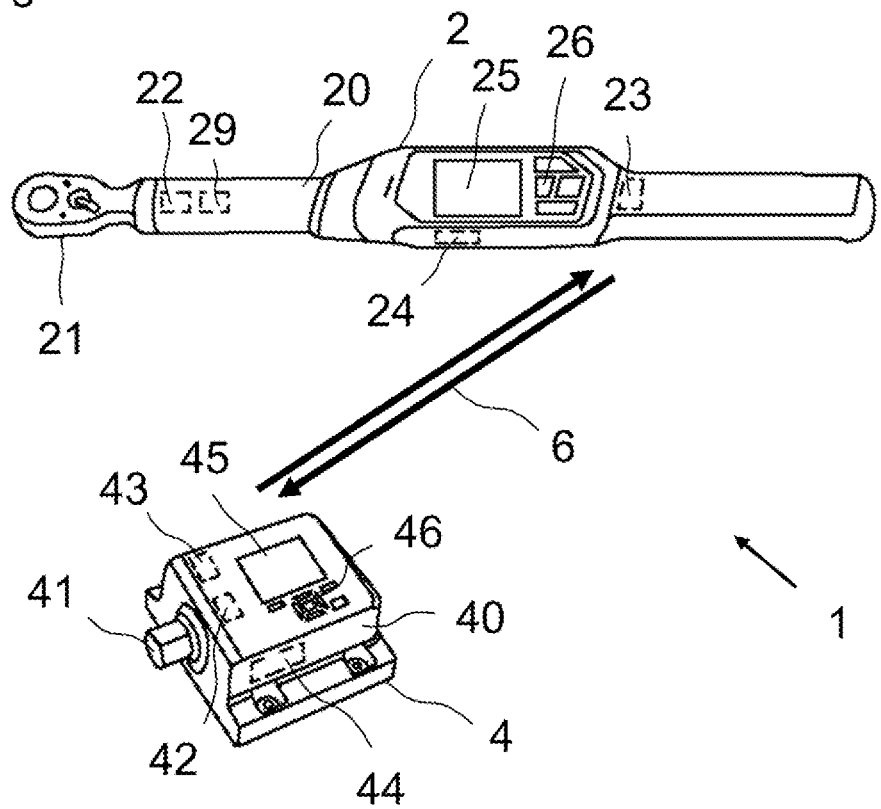
FIG. 1 shows a schematically simplified diagram of a system for unlocking a calibratable electronic torque tool.

FIG. 1 shows, schematically simplified, a system 1 for unlocking a calibratable electronic torque tool 2. In the exemplary illustration, the torque tool 2 is an electronic torque wrench. The torque wrench comprises a tool body 20 and a tool head 21, which is provided, for example, to engage in a screw head drive or to grip around a nut or to hold an attachment, which in turn grips the screw head drive or the nut. The torque tool 2 also comprises a display device 25 and operating elements 26, by which, for example, a torque currently acting on the tool head 21 can be displayed and/or a desired torque can be set. If, for example, nuts are to be tightened with a specific defined torque, this can be set by the operating elements 26. If the defined torque is reached, this attained torque is displayed on display 25 and/or signaled in another way, for example, by a sound.

A torque sensor 22, a transmitting and receiving device 23, a data processing device 24, and a shock sensor 29 are provided inside the tool body 20 and are each shown in FIG. 1 with dashed lines to clarify that they are typically not visible from the outside of tool body 20. The positions of these components shown in the torque tool 2 are merely exemplary and do not need to correspond to the position shown in FIG. 1. The torque applied to the tool head 21 or, respectively, exerted by the tool head 21, is measured by the torque sensor 22. The data processing device 24 controls the sensors 22, 29, the transmitting and receiving device 23, and the display device 25 and receives and transmits data and signals to the components of the system 1. Via shock sensor 29 it can be ascertained whether the torque tool 2 has been subjected to a shock that could potentially impair the calibration of the torque tool 2. Other events can also potentially impair calibration of the torque tool 2, for example, a torque that is too high acting on the tool head 21 or excessive use of the torque tool 2.

If the event torque tool 2 is subjected to one of the above-noted calibration impairing events, it typically must be recalibrated in a calibration laboratory. Otherwise, there is a risk of working with an improperly calibrated torque tool 2. Therefore, torque tools 2 are frequently equipped with a lock that prevents the torque tool 2 from being used when there is a possible risk that it is no longer calibrated correctly. This lock can only be overridden after recalibration, which is a time-consuming and work-intensive procedure.

To reduce this effort, the system 1 illustrated in FIG. 1 provides, in addition to the torque tool 2, a torque testing device 4 that includes a housing 40, on which a tool head holder 41, a display device 45, and operating elements 46 are provided. In addition, a torque sensor 42, a transmitting and receiving device 43, and a data processing device 44, which are shown with dashed lines, are arranged inside the housing 40.

To test whether the torque tool 2 is correctly calibrated, the tool head 21 is coupled to the tool head holder 41. In addition, a direct data link 6 is set up between the torque tool 2 and a torque testing device 4 via transmitting and receiving devices 23, 43. This data link 6 is, for example, a wireless data link 6 based on the Bluetooth standard.

A tool-side torque test value 47 is now measured by the torque sensor 22 of torque tool 2. This tool-side torque test value 47 corresponds to the torque value that is output or displayed by torque tool 2 when a predetermined torque is applied to the tool head 21. In addition, a testing device-side torque test value, which corresponds to the predetermined torque actually applied to the tool head 21, is determined by the torque sensor 42 of the torque testing device 4. Multiple pairs of tool-side torque test values 47 and testing device-side torque test values 48 can also be determined for different specified torques. The tool-side torque test value 47 is transferred to the torque testing device 4 via the data link 6. The data processing device 44 of the torque testing device 4 now compares the torque test values 47, 48. If the difference between the torque test values 47, 48 is outside of the tolerance range, which is, for example, 2% to 3% of the testing device-side torque test value 48, the torque tool 2 is no longer correctly calibrated. In this case, the display device 45 of the torque testing device 4 displays in particular that the torque tool 2 must be recalibrated. On the other hand, if the difference between the torque test values 47, 48 is within the tolerance range, an unlocking signal is generated and transferred to the torque tool 2 by the data link 6. After receiving the unlocking signal, the torque tool 2 overrides the lock, with which it was prevented from operating after registering one of the aforementioned events, so that torque tool 2 can now be used.

Figure 2:
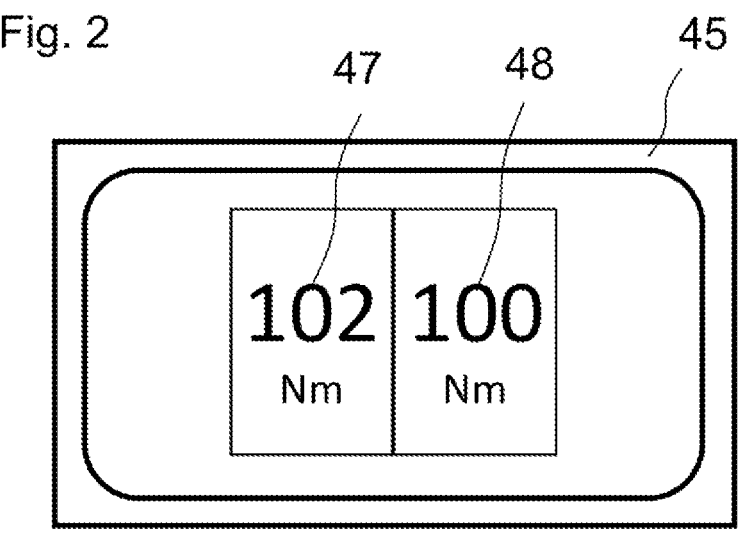
FIG. 2 shows a schematically simplified diagram of a display device of a torque testing device.

FIG. 2 shows, schematically simplified, the display device 45 of the torque testing device 4 after both the testing device-side torque test value 48 and the tool-side torque test value 47 are present in the torque testing device 4. In the exemplary embodiment shown, the test values 47, 48 are displayed next to each other on the display device 45. In this way, it can be determined at a glance whether the torque tool 2 is still correctly calibrated. An additional separate device for displaying and evaluating the torque test values, for example, an additional computer or server, can thus be omitted. In this embodiment, the system 1 comprises only the torque tool 2 and the torque testing device 4. In the example shown, the tool-side torque test value 47 is at 102 Nm, while the testing device-side torque test value 48 is at 100 Nm. The tool-side torque test value 47 is thus 2% greater than the testing device-side torque test value 48, which in the instant example is within the tolerance.

Of course, the calibration of the torque tool 2 can also be tested by the torque testing device 2 when the torque tool 2 is not locked. Due to the compact structure of the torque testing device 2 and the clear representation on the display device 45, the calibration can be checked quickly at any time.

All of the indicated features, including those which are to be inferred from the drawings alone, as well as individual features which are disclosed in combination with other features, are deemed to be essential to the invention both alone and in combination. Embodiments according to the invention can be fulfilled by individual features or a combination of several features.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SIGNS

1 System
2 Torque tool
4 Torque testing device
6 Data link
20 Tool body
21 Tool head
22 Torque sensor
23 Transmitting and receiving device
24 Data processing device
25 Display device
26 Operating elements
29 Shock sensor
40 Housing
41 Tool head holder
42 Torque sensor
43 Transmitting and receiving device
44 Data processing device
45 Display device
46 Operating elements
47 Tool-side torque test value
48 Testing device-side torque test value

What is claimed:

1. A method for unlocking a calibratable electronic torque tool that has been locked to prevented operation, the method comprising:
    coupling a tool head of the calibratable electronic torque tool to a tool head holder of a torque testing device;
    establishing a direct data link between the calibratable electronic torque tool and the torque testing device;
    determining a testing device-side torque test value of the calibratable electronic torque tool by a torque sensor of the torque testing device;
    determining a tool-side torque test value of the torque tool by a torque sensor of the torque tool;
    transferring the tool-side torque test value to the torque testing device via the direct data link;
    comparing, via a data processing device integrated in the torque testing device, the tool-side torque test value with the testing device-side torque test value;
    generating an unlocking signal if a difference between the tool-side torque test value and the testing device-side torque test value is within a specifiable tolerance range;
    transferring the unlocking signal to the calibratable electronic torque tool via the direct data link; and
    unlocking the calibratable electronic torque tool by overriding the lock via the unlocking signal transferred to the calibratable electronic torque tool.

2. The method according to claim 1, wherein the direct data link is a wireless data link.

3. The method according to claim 2, wherein the direct data link is a radio connection.

4. The method according to claim 1, wherein the tool-side torque test value and the testing device-side torque test value are displayed on a display device of the torque testing device.

5. The method according to claim 4, wherein the tool-side torque test value and the testing device-side torque test value are displayed simultaneously on a display device of the torque testing device.

6. The method according to claim 1, wherein the lock of the calibratable electronic torque tool is overridden by the unlocking signal only for a temporary period of time or a pre-specifiable number of use cycles, wherein the duration of the temporary period of time is predefinable.

7. The method according to claim 1, wherein the lock of the calibratable electronic torque tool is activatable when a shock sensor of the torque tool registers a shock that exceeds a pre-specifiable shock limit.

8. The method according to claim 1, wherein the lock of the calibratable electronic torque tool is activatable when the torque sensor of the calibratable electronic torque tool registers a torque value that exceeds a pro-specifiable torque limit.

9. The method according to claim 1, wherein the calibratable electronic torque tool comprises a torque wrench or a torque screwdriver.

10. A method for checking a calibration of a calibratable electronic torque tool, the method comprising:
coupling a tool head of the calibratable electronic torque tool to a tool head holder of a torque testing device;
establishing a direct data link between the calibratable electronic torque tool and the torque testing device;
determining a testing device-side torque test value of the calibratable electronic torque tool by a torque sensor of the torque testing device;
determining a tool-side torque test value of the torque tool by a torque sensor of the torque tool;
transferring the tool-side torque test value to the torque testing device via the direct data link; and
simultaneously displaying the tool-side torque test value and the testing device-side torque test value on a display device of the torque testing device.

11. A system for unlocking a calibratable electronic torque tool that is prevented from operation by a lock, the system comprising:
the calibratable electronic torque tool comprising a tool body, a tool head, a transmitting and receiving device, and a torque sensor; and
a torque testing device comprising a tool head holder, a transmitting and receiving device, a torque sensor, and an integrated data processing device,
wherein the tool head holder is designed to hold the tool head,
wherein the transmitting and receiving device of the calibratable electronic torque tool and the transmitting and receiving device of the torque testing device are configured to establish a direct data link between the calibratable electronic torque tool and the torque testing device,
wherein the torque testing device is configured to determine a testing device-side torque test value of the calibratable electronic torque tool by the torque sensor of the torque testing device,
wherein the calibratable electronic torque tool is configured to determine a tool-side torque test value of the calibratable electronic torque tool by the torque sensor of the calibratable electronic torque tool and to transfer the tool-side torque test value to the torque testing device via the direct data link,
wherein the data processing device is configured to receive the tool-side torque test value and the testing device-side torque test value, compare them to each other, and generate an unlocking signal when a difference between the tool-side torque test value and the testing device-side torque test value is within a specifiable tolerance range,
wherein the data processing device is furthermore configured to transfer the unlocking signal to the calibratable electronic torque tool via the direct data link, and
wherein the lock of the calibratable electronic torque tool is overridden and unlocked via the unlocking signal transferred to the calibratable electronic torque tool.

12. The system according to claim 11, wherein the torque testing device further comprises a display device, which is configured to display the tool-side torque test value and the testing device-side torque test value.

13. The system according to claim 12, wherein the display device is configured to simultaneously display the tool-side torque test value and the testing device-side torque test value.

14. The system according to claim 11, wherein the calibratable electronic torque tool further comprises a shock sensor, and
wherein the calibratable electronic torque tool is configured to activate the lock of the calibratable electronic torque tool when the shock sensor registers a shock that exceeds a specifiable shock limit.

15. The system according to claim 11, wherein the calibratable electronic torque tool is configured to activate the lock of the calibratable electronic torque tool when the torque sensor of the calibratable electronic torque tool registers a torque value that exceeds a specifiable torque limit.

16. The system according to claim 11, wherein the calibratable electronic torque tool comprises a torque wrench or a torque screwdriver.

17. A system for checking a calibration of a calibratable electronic torque tool, the system comprising:
the calibratable electronic torque tool comprising a tool body, a tool head, a transmitting and receiving device, and a torque sensor; and
a torque testing device comprising a tool head holder, a transmitting and receiving device, a torque sensor, and a display device,
wherein the tool head holder is designed to hold the tool head,
wherein the transmitting and receiving device of the calibratable electronic torque tool and the transmitting and receiving device of the torque testing device are configured to establish a direct data link between the calibratable electronic torque tool and the torque testing device,
wherein the torque testing device is configured to determine a testing device-side torque test value of the calibratable electronic torque tool by the torque sensor of the torque testing device,
wherein the calibratable electronic torque tool is configured to determine a tool-side torque test value of the calibratable electronic torque tool by the torque sensor of the calibratable electronic torque tool and to transfer the tool-side torque test value to the torque testing device via the direct data link, and
wherein the display device is configured to simultaneously display the tool-side torque test value and the testing device-side torque test value.

18. A torque testing device, which includes a tool head holder, a transmitting and receiving device, a torque sensor, and an integrated data processing device, being configured to perform a method comprising:
establishing a direct data link between the torque testing device and a calibratable electronic torque tool via the transmitting and receiving device of the torque testing device;
determining, via the torque sensor of the torque testing device, a testing device-side torque test value of the calibratable electronic torque tool, which has a tool head;
receiving a tool-side torque test value via the data link; and
at least one of:
displaying on a display device of the torque testing device the tool-side torque test value and the testing device-side torque test value; or comparing the tool-side torque test value with the testing device-side torque test value via the data processing device;

generating an unlocking signal when a difference between the tool-side torque test value and the testing device-side torque test value is within a specified tolerance range; and transferring the unlocking signal to the calibratable electronic torque tool via the direct data link.

19. The torque testing tool according to claim 18, wherein the tool-side torque test value and the testing device-side torque test value are simultaneously displayed on the display.

20. A calibratable electronic torque tool, which includes a tool body, a tool head, a transmitting and receiving device, and a torque sensor, being configured to perform a method comprising:

establishing a direct data link between the calibratable electronic torque tool and a torque testing device via the transmitting and receiving device of the calibratable electronic torque tool, determining a tool-side torque test value of the calibratable electronic torque tool via the torque sensor of the calibratable electronic torque tool, transferring the tool-side torque test value to the torque testing device via the direct data link, receiving an unlocking signal from the torque testing device via the direct data link, via the received unlocking signal, overriding a lock of the calibratable electronic torque tool and unlocking the lock.

* * * * *